United States Patent [19]

Miyamoto et al.

[11] Patent Number: 5,000,041
[45] Date of Patent: Mar. 19, 1991

[54] CONTROL APPARATUS FOR TURBINE-TYPE FLOW METER

[75] Inventors: Yoshikazu Miyamoto; Kimio Toriyabe, both of Tokyo; Kazuo Tsuge, Kanagawa; Hideaki Ikeda, Kanagawa; Teruhisa Kojima, Kanagawa; Masayuki Komaki, Tokyo; Yutaka Morita; Takatoshi Murakami, both of Hyogo; Yasuo Sato; Yasuo Koketu, both of Aichi, all of Japan

[73] Assignee: Tokico Ltd., Kanagawa, Japan

[21] Appl. No.: 350,036

[22] Filed: May 10, 1989

[30] Foreign Application Priority Data

May 10, 1988 [JP] Japan .................. 63-112760

[51] Int. Cl.⁵ .................. G01F 1/08; G01F 7/00
[52] U.S. Cl. .................. 73/861.77; 73/197; 73/861.81
[58] Field of Search ........... 73/861.77, 861.78, 861.81, 73/861.83, 197; 364/510

[56] References Cited

U.S. PATENT DOCUMENTS 3,788,142  1/1974  Goransson ............ 73/861.83
4,446,727  5/1984  Kurihara et al. ........ 73/861.81 X
4,581,946  4/1986  Kanayama ............. 73/861.83 X

FOREIGN PATENT DOCUMENTS 0004818  1/1985  Japan ................. 73/861.77

Primary Examiner—Herbert Goldstein
Attorney, Agent, or Firm—Wenderoth, Lind & Ponack

[57] ABSTRACT

Disclosed is a control apparatus for correcting the measurement of flow rates for use with a turbine-type flow meter in which the rotation of a turbine rotating in response to the flow velocity of fluid to be measured is detected to produce pulses which are, in turn, integrated to measure the flow rate of the fluid. The apparatus operates to obtain a value representing the rate of reduction in the flow rate from the pulse cycle in order to detect a first time at which the reduction rate increases above a first predetermined value and a second time at which the reduction rate decreases below a second predetermined value, produce a correction value on the basis of the pulse cycle at the second time and the time lag between the first and second times, and integrate pulses other than those generated in the period of time between the first and second times, adding the correction value from the correction value producing means to the integrated value.

2 Claims, 5 Drawing Sheets

CONTROL APPARATUS FOR TURBINE-TYPE FLOW METER

BACKGROUND OF THE INVENTION

1. Field of the Invention

This invention relates to a control apparatus for a turbine-type flow meter and, more particularly, to a control apparatus for correcting measured values of a rate of flow through a turbine-type flow meter.

2. Prior Art

Known turbine-type flow meters for metering the rate of a flow of fluid to be measured utilize an arrangement which involves detecting the rotational speed of a turbine rotating in response to the velocity of the fluid flow such as to produce pulses and integrating the pulses either to indicate the integrated value or output a signal representing a unit amount of the fluid when the integration reaches or exceeds a predetermined value.

In a pipe-line for supplying a fluid to be measured, such as municipal gas or the like, to a house or other premises, a flow meter is provided for every house which is adapted to measure the flow rate of the fluid over a wide range between extremely low and high quantities. (Since the fluid to be measured is generally municipal gas, it will hereinafter be referred to as a "gas".) An example of such a conventional flow meter is described in Japanese Utility Model Laid-Open Application No. 15520/1986.

In such conventional turbine-type flow meters, problems are encountered in that when the flow rate of the gas abruptly drops, the inertia of the turbine rotor means that a relatively long time is required for the rotational speed of the turbine rotor to decelerate to a speed which corresponds to the lower flow rate and during this period of time the measured value of the flow rate may exceed the actual figure.

SUMMARY OF THE INVENTION

The present invention solves the above-mentioned problems and provides a control apparatus for correcting the rate of flow measured through a turbine-type flow meter in order to prevent the rate of flow from being excessively integrated.

According to the present invention, there is provided an apparatus for use with a turbine-type flow meter in which the rotational speed of a turbine rotating in response to the flow velocity of fluid to be measured is detected to produce pulses which are, in turn, integrated so as to measure the flow rate of the fluid.

The apparatus comprises a detection means for obtaining a value for the rate of reduction of the flow rate from the pulse which corresponds to the rotational speed of the turbine, to detect a first time at which the reduction rate increases above a first predetermined value and a second time at which the reduction rate decreases below a second predetermined value.

The apparatus also comprises a correction value producing means for producing a correction value in response to the pulse repetition at the second time and the time lag between the first and second times.

The apparatus also comprises an integration means for integrating those pulses other than generated in the period of time between the first and second times adding the correction value from the correction value producing means to the integrated value.

With the present invention, the rate of reduction of the flow rate is compared by the detection means with the predetermined value to detect the first and second times which respectively represent the commencement and termination of any abrupt drop in the flow rate. The integration means serves to interrupt the integration during the period between the first and second times to prevent any excessive integration. The correction value producing means also serves to produce a correction value corresponding to a deficient integration value during the interruption of the integration performed by said integration means on the basis of the pulse cycle at the second time and the time lag between the first and second times, and to add the correction value to the integration value of the integration means in order to prevent erroneous integration by the integration means so as to improve the accuracy of measurement of the flow rate as indicated by said integration value.

Figure 2:
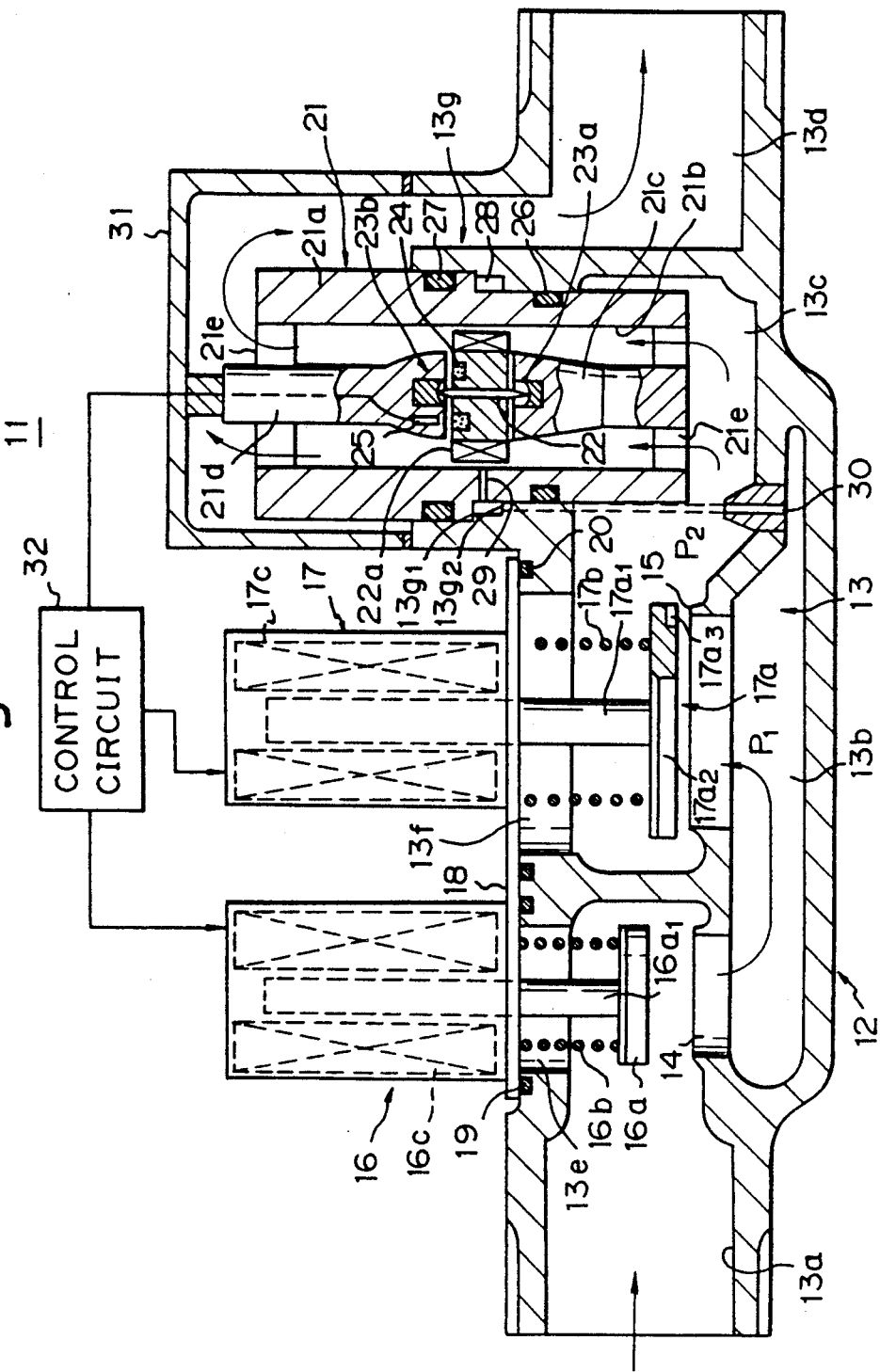
FIG. 2 is a sectional view of an example of a turbine-type flow meter to which the circuit of the present invention is applicable.

DETAILED DESCRIPTION OF THE PREFERRED EMBODIMENT:

FIG. 2 shows an example of a turbine-type flow meter to which the control circuit of the present invention is applicable. In FIG. 2, the flow meter 11 is provided mid-way along a pipe line (not shown) for supplying a gas, such as municipal gas or the like. The flow meter 11 has a flow meter body 12 which is provided with a main flow passage 13 formed therein.

The main flow passage 13 comprises an inlet passage 13a, and a separate chamber 13b, a metering chamber 13c and an outlet passage 13d. Provided between the inlet passage 13a and the separate chamber 13b is a first valve seat 14, and between the separate chamber 13b and the metering chamber 13c, a second valve seat 15.

A shut-off valve 16 is provided which includes a valve member 16a movable to be seated on the valve seat 14 on its upstream side, a coiled spring 16b for urging the valve member 16a towards the seat and an electro-magnetic solenoid 16c operable when receiving a valve-opening signal to drive the valve member 16a away from the seat.

A change-over valve 17 is also provided which includes a valve member 17a movable to be seated on the valve seat 15 on its downstream side, a coiled spring 17b for urging the valve member 17a towards the seat and an electromagnetic solenoid 17c operable when receiving a valve-opening signal to drive the valve member 17a away from the seat. The valve member 17a is formed with a disk-like valve plate $17a_2$ securely affixed by a screw or the like to a lower end of a rod $17a_1$ extending into the electromagnetic solenoid 17c. The valve plate $17a_2$ is provided on its lower stepped position with a ring-like rubber packing $17a_3$.

The electromagnetic solenoids 16c and 17c of the shut-off and change-over valves 16 and 17 are mounted on a flat plate-like mounting base 18 for closing openings 13e and 13f above the valve seat 14 and 15. O-rings 19 and 20 are provided for sealing the gap between the openings 13e, 13f and the mounting base 18.

The electromagnetic solenoids 16c and 17c will now be described in more detail. The solenoids 16c and 17c are of a self-holding type operable so that once their solenoid is energized to attract the iron core, the core is held attracted even when the solenoid is de-energized. Solenoids 16c and 17c of this type are advantages in that only an initial supply of power is required to hold the core attracted, thereby reducing power consumption.

Upon normal measurement of the flow rate, the solenoid 16c is initially energized to attract and hold the rod $16a_1$ in its upward position so that the valve member 16a of the shut-off valve 16 is moved away from its seat. Thus, the shut-off valve 16 will be operated so that in an emergency and when current is supplied momentarily to eliminate the magnetic field of the solenoid 16c, the valve member 16a is urged by the coiled spring 16b into contact with the valve seat so as to close the valve 16.

A flow rate measuring section 21 is fixedly provided in a mounting portion 13g downstream of the change-over valve 17. The flow rate measuring section 21 includes a cylindrical body 21a, a flow passage 21b provided in the body 21a, and upstream and downstream cones 21c and 21d supported by support members 21e within the flow passage 21b.

A turbine rotor or rotatable member 22 having a plurality of blades 22a on the outer periphery of its hub is positioned between the upstream and downstream cones 21c and 21d. The turbine rotor 22 is supported by bearings 23a, 23b for rotation in response to the rate of flow of fluid flowing through the flow passage 21b. The hub of the turbine rotor 22 is provided with magnets 24 embedded therein.

A pick-up 25 for detecting rotation which is comprised of a magnetic sensor or the like is embedded in the downstream cone 21c so as to face the path of the magnets 24 of the turbine rotor 22. The pick-up 25 detects the rotation of the turbine rotor 22 and outputs pulses corresponding to the rotation to a control circuit 32.

The control circuit 32 is connected to the electromagnetic solenoids 16c and 17c and detects pulses from the pick-up 25 to integrate the rate of flow and open or close the change-over valve 17 in response to the pulse intervals.

Provided in the outer periphery of the body 21a of the flow rate measuring section 21 are O-rings 26 and 27 for sealing the gap between the body 21a and the inner wall of the mounting portion 13g. The mounting portion 13g is provided on its inner wall surface with first and second steps $13g_1$ and $13g_2$, and the body 21a abuts against the first step $13g_1$ and defines a nozzle chamber 28 therebetween together with the second step $13g_2$.

The body 21a is formed with a nozzle hole 29 having a small diameter which opens at one end into the flow passage 21b and at the other end into the nozzle chamber 28. The first end of the nozzle hole is positioned to face the outer periphery of the blades 22a of the turbine rotor 22.

Also provided is a separate passage 30 which opens at one end into the separate chamber 13b and at the other end into the nozzle chamber 28. Thus, the gas flowing through the separate passage 30 is directed to the nozzle chamber 28 and then through the nozzle hole 29 and is injected to the blades 22a of the turbine rotor 22. With this arrangement, the gas is directly injected to the turbine rotor 22 to cause the latter to rotate at a relatively high speed, even when the rate of gas consumption on the downstream side is very low.

Initially, the control circuit 32 holds the shut-off valve 16 in its open condition. Thus, the valve member 16a is held in its upward position to maintain the valve 16 open, as described above, and this condition is held even when the electric current to the shut-off valve 16 is interrupted. The closure of this shut-off valve 16 occurs only in an emergency, and even in such an event a momentary or extremely brief supply of current to the shut-off valve 16 is sufficient to immediately close the shut-off valve 16, as described above.

Assuming now that gas consuming equipment connected downstream of the apparatus starts operating and, for example, a pilot light of a domestic gas-fired water heater is ignited. The gas consumption at this time is extremely low and so the change-over valve is held closed and the gas flows from the separate chamber 13b through the separate passage 30, the nozzle chamber 28 and the nozzle hole 29 and is injected to the blades 22a of the turbine rotor 22 to rotate the latter.

Such rotation of the turbine rotor 22 is detected by the pick-up 25, and as the magnets 24 embedded in the turbine rotor 22 pass thereover, the pick-up 25 outputs pulses having a pulse interval corresponding to the rotational speed of the turbine rotor 22. The control circuit 32 then integrates the pulses from the pick-up 25 and calculates the rate of flow of the gas. The control circuit 32 also detects the pulse interval of the pulses input by the pick-up 25.

When the burner of the water heater is ignited and operated to allow the use of the generated hot water, the gas consumption increases and so the turbine rotor 22 will rotate at a much higher speed. Since the control circuit 32 observes the pulse interval of the pulses output by the pick-up 25, when the gas consumption reaches the upper limit of the rate of flow through the separate passage 30 and the pulse interval reaches a first predetermined value, the control circuit 32 outputs a valve-opening signal to the electromagnetic solenoid 17c.

As a result, the solenoid 17c is energized to attract the valve member 17a upwardly away from the valve seat 15 under the action of the electromagnetic force and against the action of the coiled spring 17b. Since the coiled spring 17b is set to exert the minimum spring force necessary to close the valve, as will be described below, the valve member 17a is upwardly moved by a relatively small driving force. Furthermore, the spring force is also selected to ensure that, when a predetermined rate of flow is established on the upstream side and the fluid pressure generated thereby acts on the valve member 17a, the valve opens against the action of the spring 17a even when the solenoid is in the non-operating condition.

In the above-mentioned valve opening operation of the change-over valve 17, the gas flows through the opening of the valve seat 15 to the metering chamber 13c and then through the flow passage 21b of the flow rate measuring section 21 and is fed from the outlet passage 13d to the gas equipment downstream.

During this operation, the rotational speed of the turbine rotor 22 may temporarily decrease. With the increase in gas consumption due to the operation of the water heater, however, the rate of flow of the gas will rise to cause an increase in the rotational speed of the turbine rotor 22. The rotational speed of the turbine rotor 22 while this is occurring is detected by the pick-up 25, as described above, and the control circuit 32 calculates and integrates the flow rate based on the pulses output by the pick-up 25.

Assuming that the operation of the water heater is now changed to the condition where only the pilot light is ignited, the gas consumption of the water heater will then decrease and the flow rate of the gas passing through the flow passage 21b of the flow rate measuring section 21 will also drop. Accordingly, the rotational speed of the turbine rotor 22 will decrease too.

With the control circuit 32, when the pulse interval becomes larger than the above-mentioned first predetermined value, the change-over valve 17 opens, but the rotational speed of the turbine rotor 22 temporarily decreases due to the opening operation of the change-over valve and the pulse interval again becomes larger than the first predetermined value. If the predetermined values for the valve opening and closing operations are set at the same value, therefore, the change-over valve 17 will repeat its opening and closing operations. To prevent this, a hysteresis is provided in the opening and closing operations of the change-over valve 17. Namely, the control circuit 32 detects whether or not the pulse interval of the pulses derived from the pick-up 25 is larger than a second predetermined value which is set to be larger than the first predetermined value, and upon detection of a further drop in the rotational speed of the turbine rotor 22 and an increase in the pulse interval above the second predetermined value, a valve-closing signal is output to the change-over valve 17. As a result, the valve member 17a held in the open position is urged under the force of the spring to abut against the valve seat 15, thereby closing the main flow passage 13.

The gas then flows from the separate chamber 13b through the separate flow passage 30 to the nozzle chamber 28 and is injected from the nozzle hole 29 to the blades 22a of the turbine rotor 22. Thus, the turbine rotor 22 is rotated by the gas injected from the nozzle hole 29.

Figure 1:
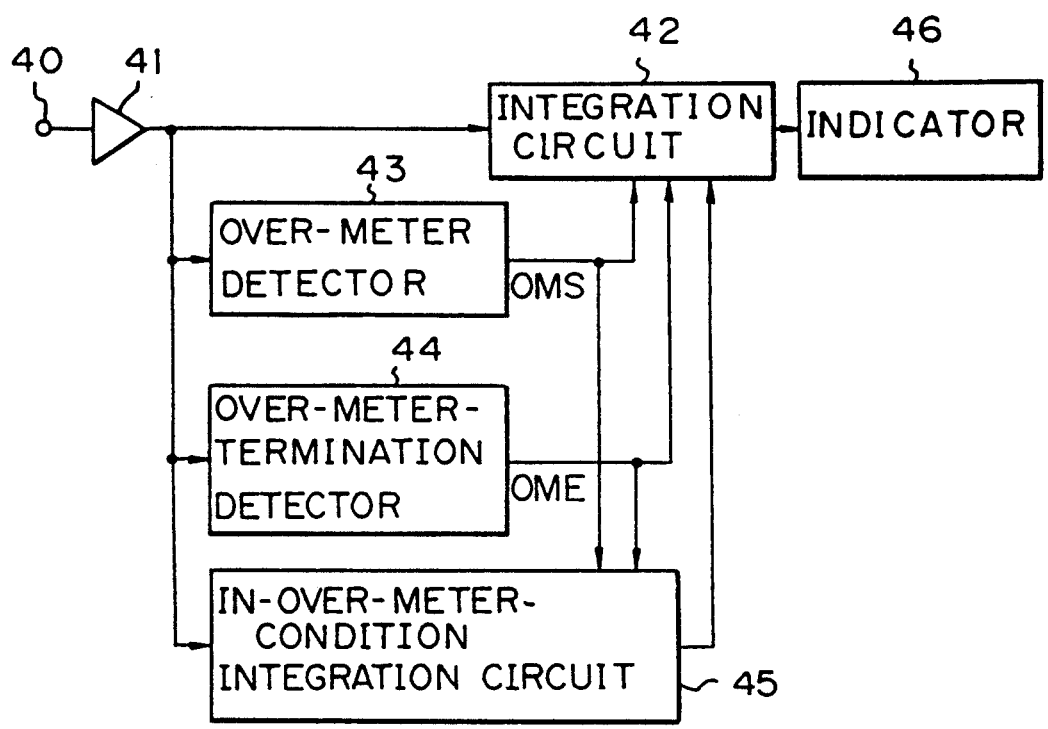
FIG. 1 is a block diagram of an embodiment of the circuit of the present invention.

FIG. 1 shows a block diagram of an embodiment of the circuit of the invention. The circuit of FIG. 1 is provided in the control circuit 32 of FIG. 2. A terminal 40 receives the pulses from the pick-up 25 which are, in turn, amplified by an amplifier 41. Thereafter, the pulses are supplied to and integrated by an integration circuit 42 used as an integration means. At the same time, the pulses from the amplifier 41 are also supplied to an over-meter detector 43, an over-meter-terminating detector 44 and an in-over-meter-condition integration circuit 45.

Figure 3A:
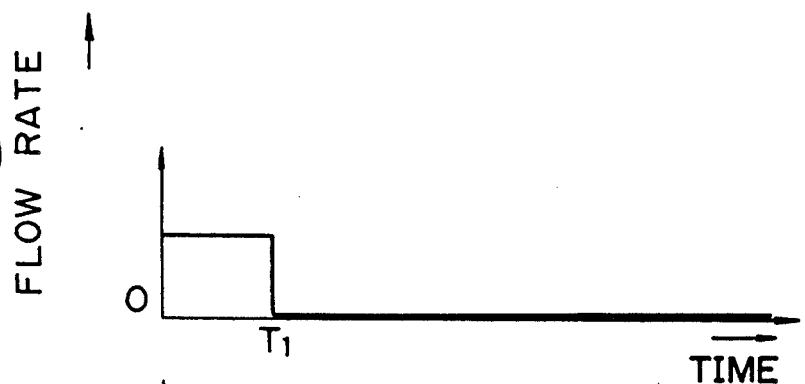
Figure 3B:
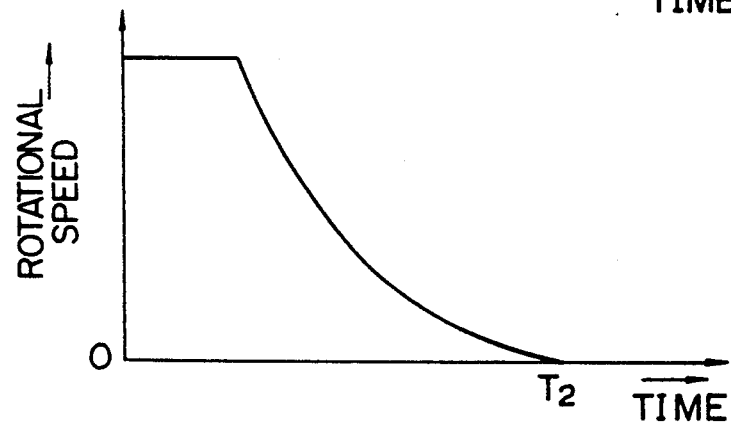

Even when use of gas is abruptly stopped and reduced to zero at a time $T_1$ as shown in FIG. 3(A), the rotational speed of the turbine rotor 22, i.e., the number of pulses per unit of time reaching the terminal 40, gradually decreases and becomes zero at a time $T_2$. Thus, the rotational speed between the times $T_1$ and $T_2$ does not correctly indicate the rate of flow of gas.

Figure 3C:
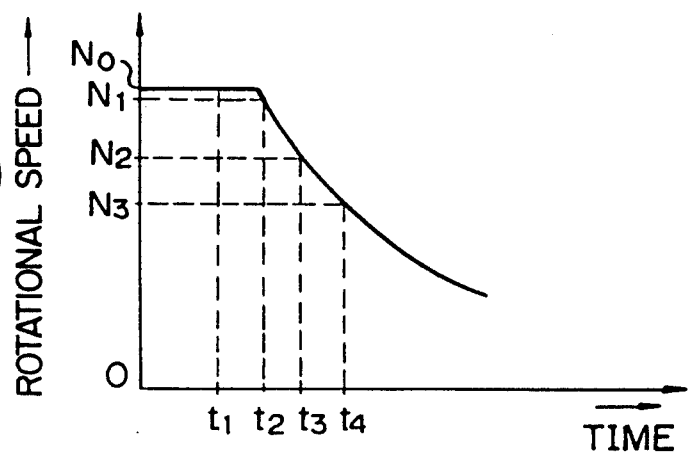

The detectors 43 and 44 shown in FIG. 1 measure the pulse rate by counting the number of pulses received during a constant period. The measurement is made to determine the rotational speed, $N_0$, $N_1$ ... at times $t_1$, $t_2$ ... with a constant interval of time as shown in FIG. 3(C).

Furthermore, the over-meter detector 43 subtracts the presently measured rotational speed $N_i$ from the previously measured rotational speed $N_{i-1}$, and when the difference $N_{i-1}-N_i$ exceeds a constant value $\Delta N$ (first time), an over-meter-commencing signal OMS is produced and supplied to the integration circuit 42 and the in-over-meter-condition integration circuit 45. The constant value $\Delta N$ is a positive value and is set at a value which shows a considerable variation in the rotational speed N measured at constant intervals of time and which also shows an abrupt variation in the flow rate.

The over-meter-terminating detector 44 produces an over-meter-terminating signal OME and supplies it to the integration circuit 42 and the in-over-meter-condition integration circuit 45 when the difference $N_{i-1}-N_i$ becomes less than the constant value $\Delta N$ or less than zero.

Similar to the over-meter detector 43, the in-over-meter-condition integration circuit 45 counts the number of pulses reached during a constant period of time to measure the $N_i$ then subsisting and also measures the over-meter time between the reception of the signal OMS and the reception of the signal OME. The product of the rotational speed at the time of reception of the signal OME, $N_i$ and the over-meter time is then obtained.

Figure 4:
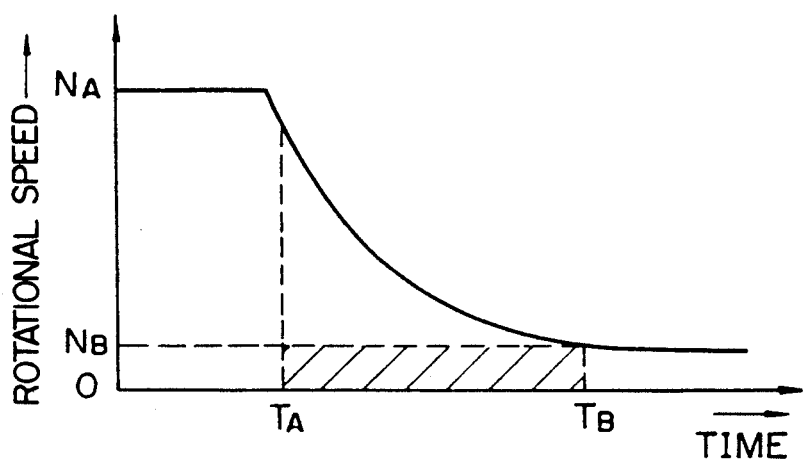
FIGS. 3(A)-(C), 4, 7 and 8 are illustrations explaining the operation of the circuit of FIG. 1.

As shown in FIG. 4, when, for example, the signal OMS is produced at a time $T_A$ and the signal OME at a time $T_B$, an in-over-meter-condition integrated value $N_B(T_B-T_A)$ corresponding to the hatched area in FIG. 4, or a correction value, is obtained by the in-over-meter-condition integration circuit 45 and supplied to the integration circuit 42.

The integration circuit 42 integrates the pulses from the amplifier 41, but this integration is interrupted during the period between the reception of the signal OMS and the reception of the signal OME. With the reception of the signal OMS, integration is achieved while adding the in-over-meter-condition integrated value from the in-over-meter-condition integration circuit 45.

The integrated value output by the integration circuit 42 is supplied to an indicator 46 which, in turn, indicates the integrated value as the rate of flow.

In this manner, during the period between the generation of the signal OMS and the generation of the signal OME, the integration circuit 42 does not perform integration so as to prevent any excessive integration of the flow rate, and even when the number of revolutions $N_i$ at the time of generation of the signal OME is not zero, the in-over-meter-condition integrated value in the period is obtained by the in-over-meter-condition integration circuit 45 and added to the integrated value of the integration circuit 42 so that any deficient integration of the flow rate is corrected and thus avoided.

In this way, the accuracy of the turbine-type flow meter is enhanced and it is thus usable at sites where large variations in the flow rate take place. Thus the potential range of application of the meter is greatly increased.

After the reception of the signal OME and when the in-over-meter-condition integrated value is totally added at a time to the integration circuit 42, the value of the flow rate to be indicated on the indicator 46 may abruptly vary. To avoid this, the in-over-meter-condition integrated value can be divided into small values and those divided small values may be added to the integration circuit 42 one by one every time the integration circuit 42 receives pulses from the amplifier 41.

Figure 5:
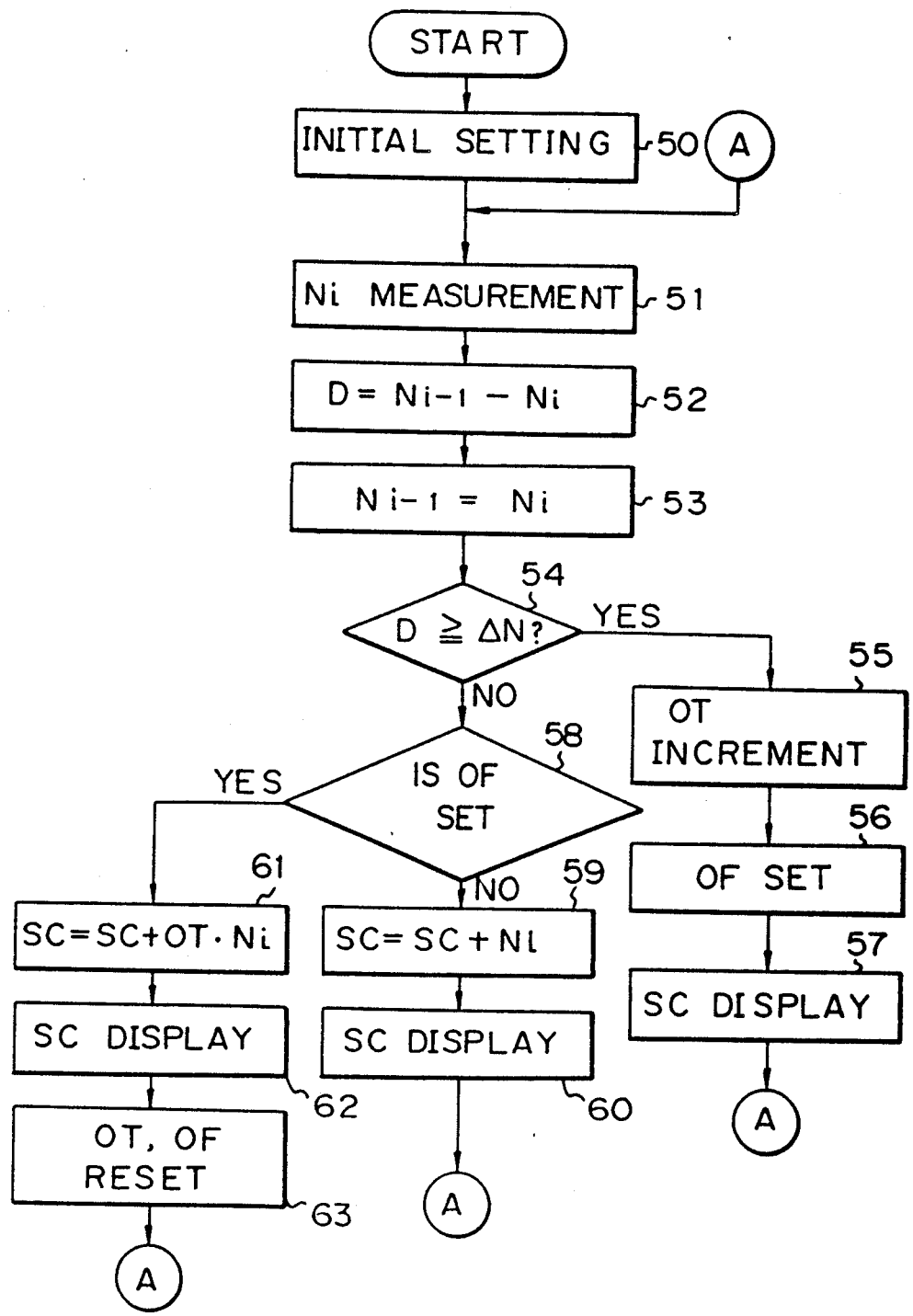
FIG. 5 is a flowchart of an example of a microcomputer that may be used for executing the operation of the circuit of the present invention.

It may be possible to perform the operation of the circuit of FIG. 1 using a microcomputer. FIG. 5 shows a flowchart for such an operation. After the initial setting (step 50), the rotational speed Ni is measured (step 51), the difference D from the previous rotational Ni-1 is obtained (step 52), and substitution of the rotational speed Ni for the previous rotational speed Ni-1 is performed (step 53).

The difference D is then compared with a constant value ΔN (step 54), and if the difference D is larger than the constant value ΔN, the timer OT is incremented (step 55), the over-meter flag is set (step 56), the value of the integrating counter is displayed as the flow rate (step 57) and the routine is then returned to step 51.

If the difference D is less than the constant value ΔN a determination is made as to whether or not the flag OF is set (step 58), and if the flag OF is not set, the rotational speed Ni is added to the integrating counter SC (step 59) and the value of the counter SC is displayed as the flow rate (step 60). If the flag OF is set, the product (in-over-meter-condition integration value) of the rotational speed Ni and the timer OT is added to the value of the counter SC (step 61), the value of the counter SC is displayed as the flow rate (step 62) and the timer OT and the flag OF is reset (step 63). After the execution of the steps 60 and 63, the routine is then returned to step 51. In the above-described embodiment, the value ΔN for the first time and the value ΔN for the second time are equal to each other.

Figure 6:
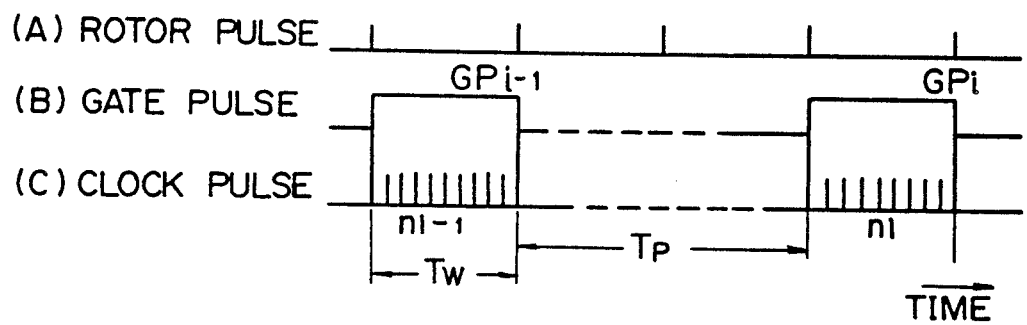
FIG. 6 shows waveforms used to explain a modified embodiment of the circuit of the present invention.

In the region where the rotational speed of the turbine rotor 22 is small, the pulse repetition of the pulse (rotor pulse) entering the terminal 40 becomes long, as shown in waveform (A) of FIG. 6. In this case, a gate pulse shown in waveform (B) of FIG. 6 is produced from the rotor pulse and the H-level of the gate pulse [shown in waveform (C) of FIG. 6] can be used in place of the rotor pulse. In such a case, the pulse interval $T_P$ of the gate pulses is set to become larger than the pulse width $T_W$, so that the difference between the number of clock pulses $n_{i-1}$ and $n_i$ corresponding to the gate pulses $GP_{i-1}$ and $GP_i$, respectively, become large and the over-meter detection and the over-meter-termination detection can be easily accomplished.

In the region where the flow rate is large, when the flow rate abruptly increases the rise in the rotational speed tends to be delayed. This is, however, cancelled with the delayed fall in the rotational speed at the time of an abrupt decrease in the flow rate. Thus, the correction circuit of the present invention may be arranged to operate only when the flow rate is less than a predetermined value.

Figure 7:
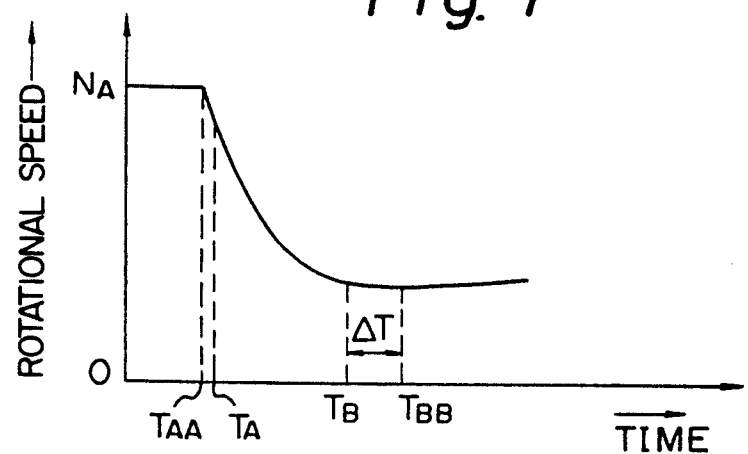

Since the time $T_A$ of the over-meter detection is delayed from the time $T_{AA}$ when the abrupt decrease in the flow rate takes place, as shown in FIG. 7, the rotational speed during this delayed period is integrated by the integration circuit. In order to correct this measurement, the signal OME may be output at a time $T_{BB}$ which is delayed from the time $T_B$ of the over-metering-termination detection by a time ΔT sufficient to cancel the measurement. With this, the over meter time is $T_{BB} - T_A$ so that excessive integration of the flow rate between the times $T_{AA}$ and $T_A$ (the above-mentioned measurement) can be cancelled with the deficient integration of the flow rate due to the extended stoppage of integration of the time ΔT.

When the flow rate is abruptly reduced to a considerable extent such as to become extremely low, the amount of correction of the in-over-meter-condition integration is extremely small and there is practically no need for correction. Therefore, when the rotational speed becomes less than a predetermined value $N_{TH}$, as shown in FIG. 8, the rotational speed can be regarded as a constant value k so that the value of the in-over-meter-condition integration can be $k(T_B - T_A)$ and, further, the constant value K may be zero.

In a specific application, when the flow rate abruptly becomes zero, the indication of the value may be stopped, as will be described below. When the flow rate abruptly becomes zero, the rotor pulse in the low speed rotation obtained by the subsequent inertial rotation would be deemed as over-meter termination and the in-over-meter-condition integration value based on the inertial rotation would be abruptly integrated into the measured value, so the rotor pulses obtained by the subsequent inertial rotation might be integrated as measured values. Even when the flow rate is abruptly decreased to an extremely small value, the in-over-meter-condition integration value would be abruptly integrated into the measured value when the over-meter at low speed rotation ceases, and thus the indication of the measured value would greatly vary with irregularity, nevertheless the actual flow rate at that time is extremely small.

Figure 8:
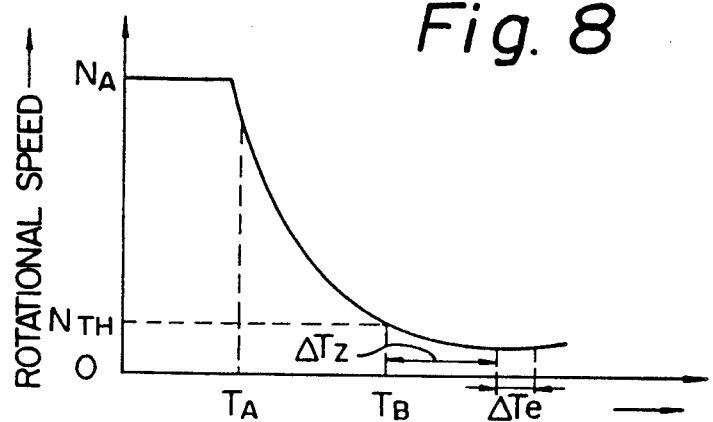

In order to correctly distinguish the decision of over-meter-termination made in a case where the rotation completely ceases from that made in a case where there is still a low flow rate, as shown in FIG. 8, a time ΔTe equal to the time period of rotation of one the rotor immediately before stoppage is set as a reference. A waiting time ΔTz is set by employing the period of time from when the rotation becomes lower than a predetermined value $N_{TH}$ until when the rotation completely stops thereafter in the case where the flow rate is changed to zero. When a flow rate pulse is detected within the time ΔTe following the lapse of the waiting time ΔTz after the rotation had become lower than the value $N_{TH}$, the correction value is transferred to the integration circuit 42 and the content of the integration circuit 42 is transferred to the indicator 46 by utilizing a predetermined rule. If there is no pulse within the time period ΔTe following the time ΔTz, the content of the in-over-meter-condition integration circuit 45 becomes zero and the operation is returned to the normal mode. This will pose no problem in practice, because the correction value has already become extremely small. Thus, the above-mentioned irregular variation in the indication can be avoided.

As described above, the correction circuit for the turbine-type flow meter in accordance with the present invention is advantageous in that when the flow rate abruptly decreases, excessive integration of the flow rate can be prevented and the accuracy of the flow rate measurement is enhanced to expand the application of the turbine-type flow meter and the practical utility thereof.

What is claimed is:

1. A control apparatus for correcting measured values of a rate of flow for use with a turbine-type flow meter comprising:

a turbine rotor which rotates at a speed corresponding to the flow velocity of a fluid to be measured;

a pulse producing means for detecting the rotational speed of said turbine rotor and for producing pulses in response thereto having a pulse repetition rate corresponding to the rotational speed of said turbine rotor;

a count means for receiving said pulses from said pulse producing means and for calculating the pulse repetition rate and for obtaining a value representing the rate of reduction in the flow rate from the pulse repetition rate and for providing an output signal corresponding thereto;

a comparing means for receiving said output signal from said count means and for detecting a first time at which the reduction rate increases above a first predetermined value and a second time at which the reduction rate decreases below a second predetermined value and for providing output signals corresponding thereto;

a correction value producing means for receiving said output signals from said count means and said comparing means and for producing a correction value on the basis of the pulse repetition rate at said second time and the time lag between said first and second times and for providing an output signal corresponding thereto, and an integration means for receiving and integrating pulses from the pulse producing means other than those produced during the period of time between said first and second times and for receiving said output signal from said correction value producing means and for adding the correction value produced by the correction value producing means to the integrated value to output a signal corresponding to the corrected measured value of the rate of flow of the fluid to be measured.

2. An apparatus according to claim 1, wherein said count means counts pulses output from the pulse producing means during a predetermined period of time to calculate said pulse repetition rate.

* * * * *